INVENTORS
WILLIAM H. LEE
ALAN W. RICHARDS

| CONTACT PHASE | LOW | MED. | HIGH |
|---|---|---|---|
| M1 | X | X | |
| M3 | | X | X |
| M2 | | | X |
| M4 | X | | |

United States Patent Office 3,426,260
Patented Feb. 4, 1969

3,426,260
CONTROL FOR PRINTING PRESS DRIVE UTILIZING SECONDARY CONTROL CIRCUIT FOR A WOUND ROTOR INDUCTION MOTOR
William H. Lee, Lakewood, and Alan W. Richards, Lyndhurst, Ohio, assignors to Harris Intertype Corporation, Cleveland, Ohio, a corporation of Delaware
Filed Apr. 18, 1966, Ser. No. 543,267
U.S. Cl. 318—240          17 Claims
Int. Cl. H02p 7/56

ABSTRACT OF THE DISCLOSURE

A drive for a printing press including a wound rotor induction motor having a speed control circuit connected to the secondary winding. The speed control circuit includes an adjustable transformer for adjustment of motor speed under running condition without affecting the setting of a speed which is established for operation under other conditions.

---

The present invention relates to an electric motor drive and more particularly relates to an electrical motor drive for a printing press.

An object of the present invention is the provision of a new and improved drive for a printing press including a wound rotor motor having a secondary winding which is electrically connected to a speed control circuit including an electrical load coupled to the motor secondary by a transformer, the impedance of the speed control circuit being changeable to change the motor speed and provide running and trip speeds for the press and which is so constructed and arranged that the speed control circuit is adjustable to vary the speed of the press at trip speed and running speed with adjustment of the running speed having no effect on the trip speed.

Another object of the present invention is the provision of a new and improved drive for a printing press including a wound rotor motor having a secondary windings connected with a speed control circuit including a load circuit coupled to the motor secondary by a transformer, the impedance of the speed control circuit being changeable to change the speed of the motor between trip and running speeds of the press and the running and trip speeds of the press being changeable by changing the effective turns ratio of the transformer, and which is so constructed and arranged that adjustment of the running speed does not affect the trip speed.

Another object of the present invention is the provision of a new and improved wound rotor motor drive in which the secondary of the motor is coupled to a load by a transformer through adjustable tap means which is adjustable to vary the coupling ratio of the transformer and the speed of the motor to obtain an adjustable operating speed or through circuit means independent of the adjustable tap means to provide a preselected speed which is adjustable and which is independent of the setting of the tap means.

Another object of the present invention is the provision of a new and improved drive for a printing press including a wound rotor motor associated with a speed control circuit including a load circuit coupled to the secondary winding of the motor by a transformer the coupling ratio of the transformer being changeable to control current in the secondary winding to running of the press and the impedance of the load circuit being adjustably variable to control current in the secondary winding when the press is operating at trip speed, and which is so constructed and arranged that adjustment of the running speed does not affect the trip speed.

Another object of the present invention is the provision of a new and improved drive for a printing press including a wound rotor motor and a speed control circuit which includes a load circuit coupled to a secondary of the motor by a transformer and frequency responsive means for changing the torque transmitted between the motor and the press in response to frequency in the motor secondary by changing the voltage per turn in a primary circuit of the transformer and simultaneously changing the load in the load circuit across a secondary of the primary circuit.

Other objects and advantages of the present invention will become apparent from a consideration of the description of the preferred embodiment of the invention which follows and from the drawings which form a part of the specification and in which.

Figure 1:
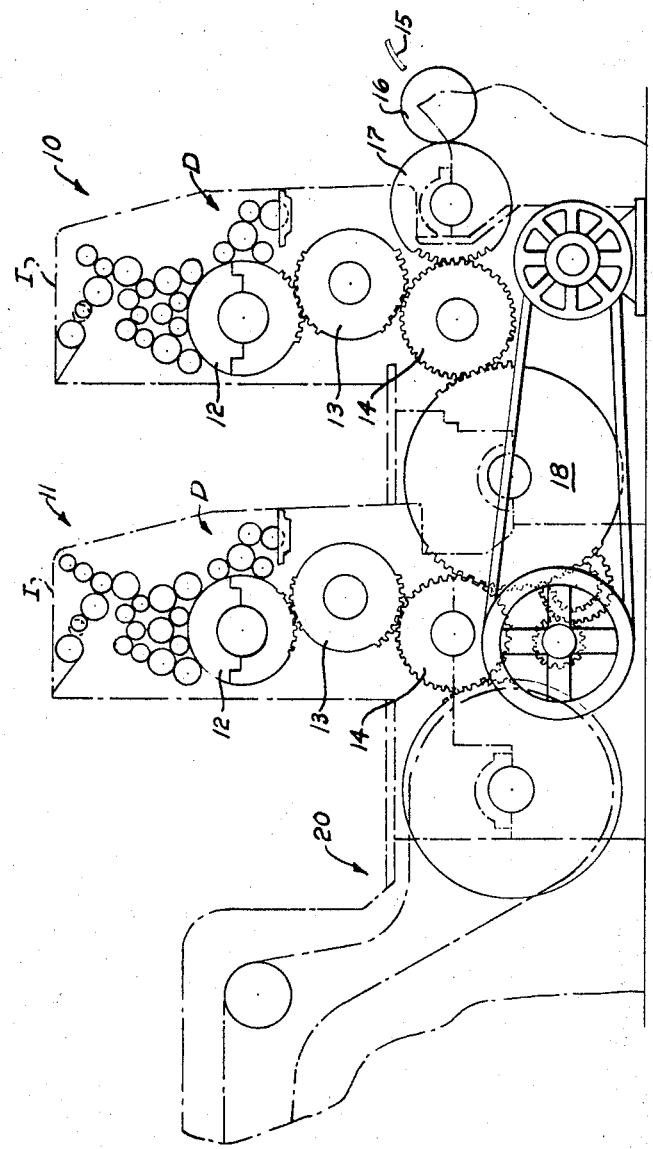
FIG. 1 is an elevational view of a printing press embodying the present invention.

Referring to FIG. 1, the present invention is shown as embodied in a lithographic sheet fed printing press having printing units 10, 11. Each printing unit includes a plate cylinder 12, a blanket cylinder 13, and an impression cylinder 14. A conventional dampener D and a conventional inker I is associated with each plate cylinder. The sheets to be printed are fed to the first printing unit 10 from a feedboard 15 by an advance cylinder 16 and a feed cylinder 17. The sheets are transferred from the first printing unit 10 to the second printing unit 11 by a transfer cylinder 18 and are delivered from the printing unit 11 by a conventional delivery mechanism 20. The printing press is driven by a motor 21. The cylinders of the printing press are intergeared in a conventional manner by gears on the press cylinders and the drive from the motor 21 is to the transfer cylinder 18. The delivery mechanism 20 is also driven from the motor 21 by the gears on the cylinders of the press.

The rotor windings of a wound rotor motor 21 are connected to a speed control circuit which includes a transformer and an electrical load circuit, the transformer coupling the load circuit to the rotor winding. The electrical load apparent to the rotor windings of the motor is adjustable to vary the speed of the motor as it drives the press. The motor 21 is also associated with a control circuit A shown in FIG. 4 which is operative to control operation of the motor and the speed control circuit.

Figures 2, 3:
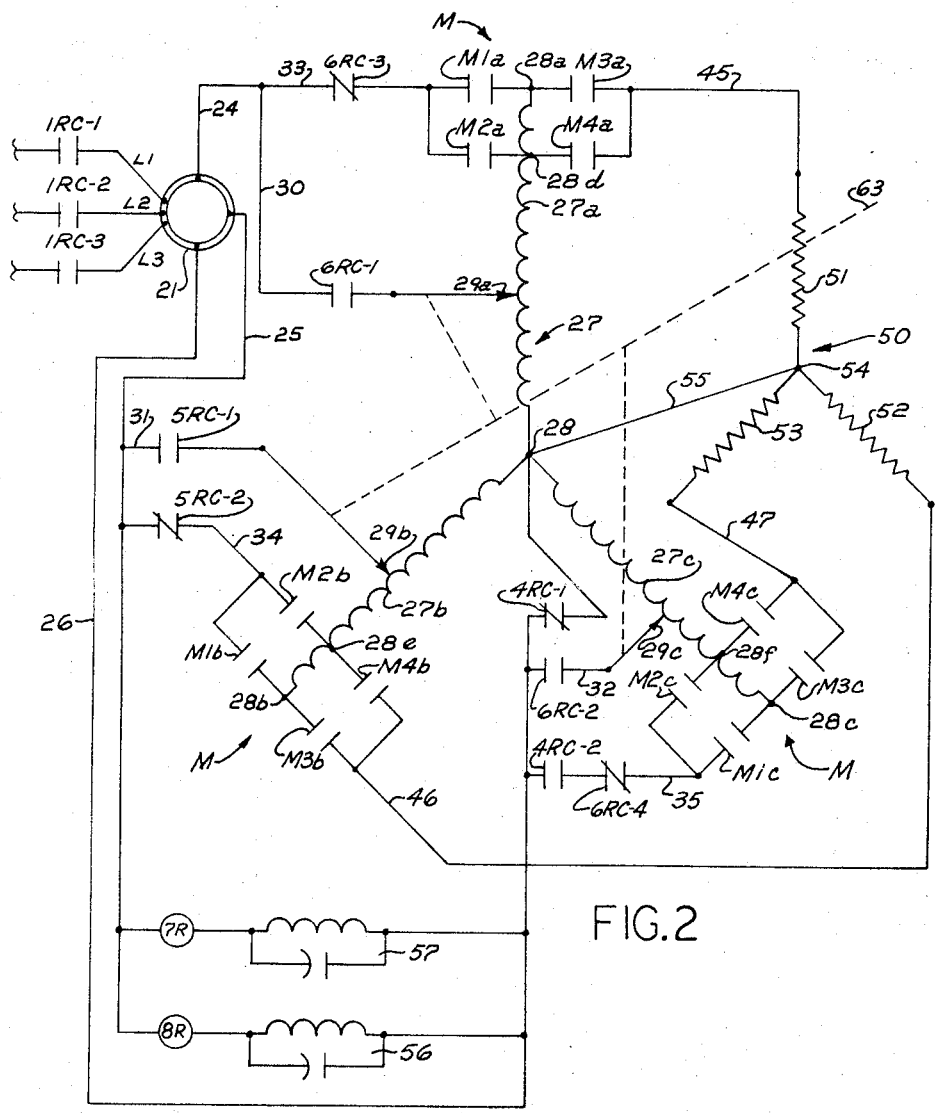
FIG. 2 is a diagrammatic view of a portion of the printing press shown in FIG. 1 and illustrating a motor drive and control circuitry therefor.
FIG. 3 is an illustration of the relations of elements of FIG. 2 during circuit operating conditions of the printing press.

Referring to FIG. 2, the wound rotor motor 21 is shown diagrammatically as having a primary winding energized from a three phase 60-cycle electric power source indicated by the lines L1, L2, L3. The line L1, L2, L3 include starting contacts 1RC–1, 1RC–2, 1RC–3 of a starting relay 1R. The rotor of the motor 21 constitutes the secondary winding of the motor and has three phase windings, not shown, which are connected to phase conductors 24, 25, 26 in a conventional manner as for example by slip rings and brushes. The phase conductors 24, 25, 26 connect the rotor of the motor 21 to a load through a transformer means 27. The transformer means 27 comprises, in the illustrated embodiment, three autotransformers 27a, 27b and 27c having respective transformer coils with a common end terminal 28 and with respective end terminals 28a, 28b, 28c, and intermediate taps 28d, 28e, 28f adjacent the end terminals 28a, 28b, 28c and with respective sliding taps 29a, 29b, 29c.

In the illustrated and preferred embodiment, the phase conductors 24, 25, 26 are connected to the transformer means 27 through either conductors 30, 31, 32 or conductors 33, 34, 35. The conductors 30, 31, 32 are connected to their respective transformers through normally open contacts 5RC–1, 6RC–1, 6RC–2 of relays 5R and 6R respectively while the conductors 33, 34, 35 are connected to their respective transformers through normally closed contacts 5RC–2, 6RC–3, 6RC–4 of the relays 5R and 6R. The conductor 35 additionally includes normally open contacts 4RC–2 of a relay 4R. The transformers 27a, 27b, 27c are connected at one of their ends to the common terminal or neutral 28 and at their other ends to a load circuit, or network 50 by conductors 45, 46, 47 respectively.

The secondary circuits of the autotransformers 27a, 27b, 27c includes a load in the form of a Y connected resistor network 50 comprising resistors 51, 52, 53, which have a common junction 54 at their ends and are connected at their other ends to the conductors 45, 46, 47 respectively. The junction 54 and the terminal 28 of the autotransformers are connected together by a conductor 55 so that a respective resistor of the load network is connected across the secondary of each autotransformer.

The conductor 45 is connected either to the terminal 28a or the terminal 28d of the autotransformer 27a through a contact M3a of a three-position switch M or to the terminal 28d through a contact M4a of the switch M. Similarly, the resistor 52 is connected by the conductor 46 to either the end terminal 28b of the transformer 27b through contacts M3b or contacts M4b of the switch M and the resistor 53 and is connected through the conductor 47 to either the end terminal 28c or intermediate terminal 28f of the autotransformer 27c through a contact M3c or a contact M4c of the switch M. The switch M is a three-position switch and either the contacts M3a, M3b, M3c or the contacts M4a, M4b, M4c will be closed depending upon the setting of the switch. The position of the switch controls the speed of the motor 21 between low, medium and high speeds thereof. The contacts M3a, M3b and M3c are closed when the switch M is in its medium and high position while the contacts M4a, M4b and M4c are closed when the switch M is in its low position.

When the motor is operating at a run speed, the relays 5R and 6R are energized to connect the phase conductors 24, 25 and 26 to the taps 29a, 29b and 29c of the autotransformers through the contacts 6RC–1, 5RC–1 and 6RC–2 respectively. With these contacts closed, the autotransformers will act as step-up transformers and the running speed may be adjusted by adjusting the position of the sliding taps 29a, 29b, 29c which are preferably ganged to operate together and are effective when moved to change the transformer ratio in a substantially stepless manner.

The speed of the motor may be changed to a preselected slow speed by de-energizing the relays 5R and 6R which open the contacts 5RC–1, 6RC–1 and 6RC–2 to disconnect the movable taps 29a, 29b and 29c from the phase conductors of the secondary of the motor. The de-energization of the relays 5R, 6R connects the phase conductors to either the end terminals 28a, 28b, 28c of the autotransformers or to the intermediate terminals 28d, 28e and 28f of the autotransformers depending upon the setting of the switch M. The switch M has contacts M1a, M2a which connect the phase conductor 24 to the terminals 28a, 28d, respectively, of the autotransformer 27a through the normally closed contact 6RC–3 of the relay 6R. Similarly, the phase conductor 25 is connected through the normally closed contacts 5RC–2 of the relay 5R to the end terminal 28b of the autotransformer 27b by contacts M1b of the switch M and to the intermediate terminal 28e of the autotransformer 27b through the contacts M2b of the switch M. The switch M also has contacts M1c and M2c which respectively connect the phase conductor 26 to the end terminal 28c and the intermediate terminal 29f respectively of the transformer 27c through the normally closed contacts of relay 6RC and through the normally opened contacts 4RC–2 of a relay 4R to the phase conductor 26. As is explained hereinafter the relay 4R is normally energized when the press is running at run speed and the contacts 4RC–2 will therefore be closed when the relays 5R and 6R are de-energized to cause the motor to operate at a trip slow speed.

When the relays 5R and 6R are de-energized to operate the motor at a trip slow speed, the slidable taps 29a, 29b and 29c are disconnected from their respective phase conductors and closing of the contacts 6RC–3, 5RC–1 and 6RC–4 will complete a circuit to either the end terminals 28a, 28b, 28c of the intermediate terminals 28d, 28e and 28f, depending on the position of the switch M, to effect operation of the motor at a trip slow speed. If the switch M is set at its low position, or its medium position, the circuit will be completed through the contacts M1a, M1b and M1c to the end terminals 28a, 28b and 28c. If, however, the switch M is in its high position the circuit from the phase conductors will be completed through the contacts M2a, M2b and M2c to the intermediate terminals 28d, 28e and 28f.

The disconnection of the slidable taps 29a, 29b, 29c and the connection of the phase conductors to either the end terminals 28a, 28b, 28c or the intermediate terminals 28d, 28e, 28f changes the transformation ratio of the autotransformers resulting in reduction in speed of the motor to a speed corresponding to the trip slow speed of the press. The particular trip slow speed at which the motor operates depends upon the setting of the switch M. If the switch M is in its low position where the contacts M1a, M1b, M1c and the contacts M4a, M4b, M4c are closed, the autotransformer operates as a step-down transformer. If the switch M is in its medium position where the contacts M1a, M1b, M1c and the contacts M3a, M3b, M3c are closed, the autotransformer has a one to one ratio while if the switch M is in its high speed position the contacts M2a, M2b, M2c and the contacts M3a, M3b, M3c are closed and the transformer acts as a step-up transformer and a higher speed is available.

Figure 4:
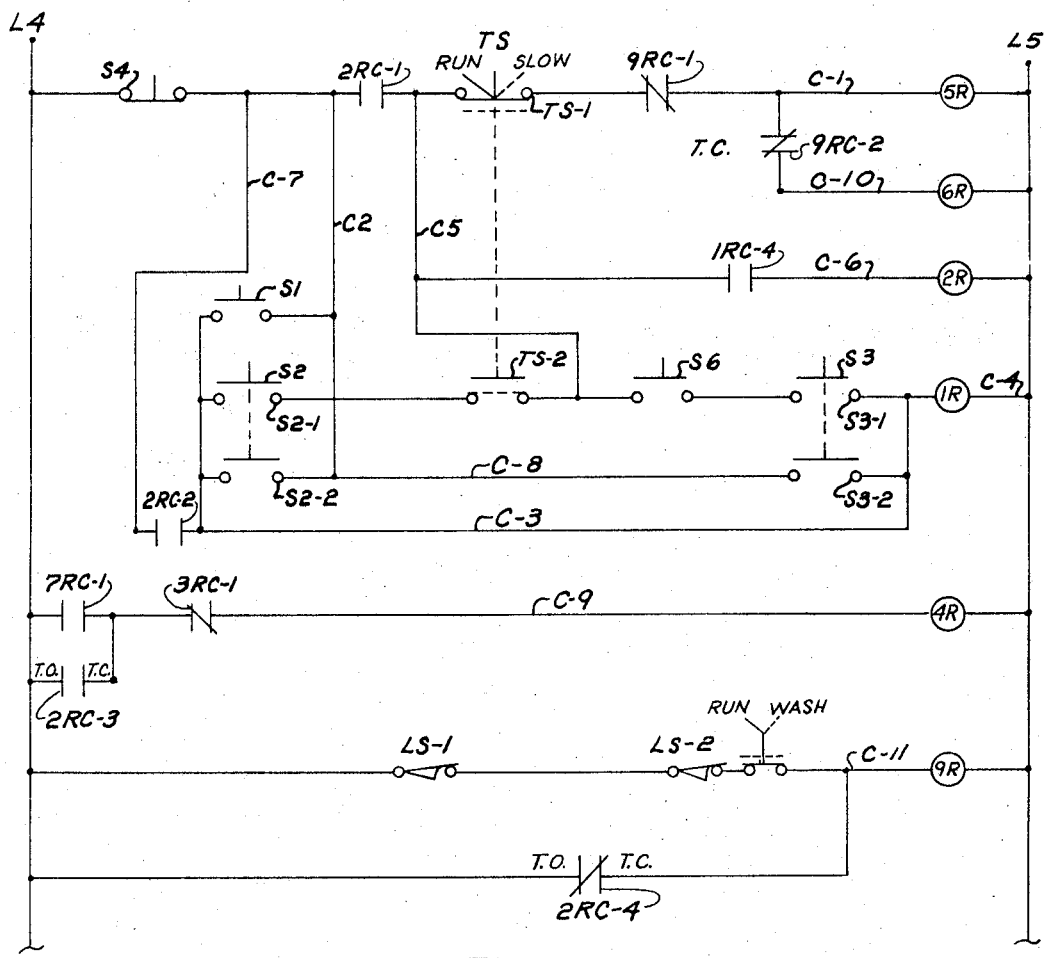
FIG. 4 is a schematic illustration of a portion of the printing press shown in FIG. 1.

The relay 4R is included in the circuitry to provide increased torque on starting. Normally the relays 5R, 6R are de-energized on starting so that the motor control circuit is basically in its trip slow speed condition. This, however, provides minimum starting torque for the motor. To increase the torque on starting, the relay 4R is provided which is controlled by a frequency responsive relay 8R. The frequency responsive relay 8R is connected in series with a tuned circuit 56 across phase conductors 25, 26 and is energized when the frequency of the secondary is between standstill frequency and 45 cycles, corresponding to a speed lower than one-fourth speed in the case of a 60-cycle primary current, and is de-energized at speeds above one-fourth speed. Consequently, when the motor is at a standstill, the relay 8R is energized and its normally closed contacts 8RC–1 in a circuit for energizing the relay 4R, see FIG. 4, are open. With the contacts 8RC–1 open, the relay 4R is de-energized, opening its contacts 4RC–2 connected between the phase conductor 26 and either the terminal 28f, or the terminal 28c, of the autotransformer 27c. The relay 4R has normally closed contacts 4RC–1 which, when the relay is de-energized, connect the phase conductor 26 to the neutral terminal 28. This effectively removes the autotransformer 27c and connects the autotransformers 27a and 27b directly across the phase conductors 24, 26 and 25, 26 respectively. Consequently, the voltage across the primary circuits of these outer transformers are increased over what it would be if the autotransformer 27C were in the circuit through the contacts 6RC–4 and the load on the secondary circuit of the transformer means is reduced since the resistor 53 is effectively removed from the circuitry. This will provide increased starting torque. When the motor comes up to about one-fourth speed the relay 8R is de-energized by operation of the tuned circuit 56, closing its contacts 8RC–1 to energize the relay 4R through contacts 2RC–3 of a relay 2R which is energized when the motor is operating. Energization of the relay 4R opens its contacts 4RC–1 and closes contacts 4RC–2 to connect the autotransformer 27c into the secondary circuit of the motor.

When the motor 21 is to be stopped, the forward relay 1R is de-energized to open its contacts for energizing the primary circuit of the motor. Normally the relays 5R and 6R will be de-energized in this condition and the relay 2R would also normally be de-energized to open its contacts 2RC–3. Opening of the contacts 2RC–3 causes a de-energization of the relay 4R, to set the motor control circuit for high starting torque. However, on stopping of a motor it is desirable to keep the impedance of the motor secondary at a high level. To this end, a braking relay 7R is provided. The braking relay is connected across the phase conductors 25, 26 in series with a tuned circuit 57. The braking relay 7R is normally de-energized but is energized in response to frequencies higher than about 65 cycles. When the forward contacts are opened to stop the motor, the frequency in the secondary will be above 65 cycles until shortly before the motor reaches a stop condition. The energization of the relay 7R closes its normally open contacts 7RC–1 to complete a holding circuit around the contacts 2RC–3 of the control relay 2R to maintain the relay 4R energized while the motor is stopping. This assures that a maximum impedance will be seen by the secondary of the motor as the motor is stopped.

FIG. 4 shows the circuit for energizing the relays 5R, 6R, 2R, 1R, and so forth to start and stop the motor. Referring to FIG. 4, when the motor is to be started, the forward start relay 1R is energized to close its contacts 1RC–1, 1RC–2, 1RC–3 to energize the primary of the motor. The motor start relay 1R is energized by depressing a normally open push button switch S1, depressing a normally open push button switch S2, having contacts S2–1, S2–2, or depressing normally open push button switch S3 having contacts S3–1, S3–2 to complete a circuit through the relay 1R between the lines L4, L5.

The power line L4 is connected to the forward start relay 1R through a conductor C1 including a normally closed press stop switch S4, a conductor C2 connected with a conductor C3 through the switches S1 or S2 and to a conductor C4 to which the relay 1R is connected. The conductor C4 is connected to the power line L5 completing the circut between lines L4, L5. Energization of the starting relay 1R closes its normally open contacts 1RC–1, 1RC–2, 1RC–3 as well as contacts 1RC–4, which are connected in an energization circuit for a relay 2R. Closing of any of the push button switches S1, S2, S3 causes the press to be driven in a forward direction as long as the switches are depressed.

When the relay contacts 1RC–1, 1RC–2, 1RC–3 are closed, the motor 21 is energized through the power lines L1, L2, L3. When the three phase current passes through the field windings of the motor, a 60-cycle three phase standstill current is induced in the wound rotor of the motor. This standstill frequency energizes the relay 8R as described to provide increased starting torque of the motor. The relay 8R remains energized until the about one-fourth speed, or 45 cycles, at which time the relay 8R is de-energized and the transformer means 27 functions normally in the speed control circuit.

When it is desired to run the press continuously at trip speed, the switch S2 is depressed with a toggle switch TS, in its "slow" position, completing an energization circuit for the relay 2R. The energization circuit for the relay 2R may be traced from the line L4 through conductors C1, C2, switch contacts S2–2, S2–1, TS1–2 to the conductors C5, C6, the relay 2R and line L5.

Energization of the relay 2R closes the normally open contacts 2RC–1, 2RC–2, 2RC–3. When the contacts 2RC–1, 2RC–2 are closed, holding circuits are completed through the relays 1R, 2R maintaining the relays energized subsequent to opening of the switch contacts S2–1, S2–2, TS–2. The contacts 2RC–3 are closed to permit an energization circuit for a relay 4R on a conductor C9 to be closed. The circuit completed by closing the contacts 2RC–1 can be traced from the line L4 to conductor C1, through the contacts 2RC–1, the conductors C5, C6, the relay 2R and to the line L5. The circuit completed by closing contacts 2RC–2 can be traced from the line L4 to the conductor C1, a conductor C7 through the contacts 2RC–2, the conductors C3, C4, the relay 1R and to the line L5. The circuit completed by closing the contacts 2RC–3 can be traced from the line L4, through the contacts 2RC–3 to the conductor C9, through normally closed contacts 8RC-1, the relay 4R and to the line L5.

Alternatively, the press may be operated continuously at trip speed by simultaneously depressing switches S3, S6 with the toggle switch TS in its "slow" position, completing energization circuits for the relays 1R, 2R. When the relays 1R, 2R are energized their associated contacts will be actuated as described supra. The alternative energization circuit for the relay 1R may be traced from the line L4, through conductors C1, C2, a conductor C8, the contacts S3–2 to the conductor C4, through the relay 1R and to the line L5. The alternate energization circuit for the relay 2R can be traced from the line L4 to conductors C1, C2, C8 through the contacts S3–2, S3–1 to the conductors C5, C6, through the relay 2R and to the line L5.

In order to increase the speed of the press to its running speed, the toggle switch TS1 of the circuit A is moved to the "fast" position closing the contacts TS1–1. When these contacts are closed, the press will continue to operate a trip speed until a relay 9R is de-energized to close normally closed relay contacts 9RC–1, 9RC–2 in the energization circuit for the relays 5R, 6R. Energization of the relays 5R, 6R will accelerate the press to its running speed as described. The relay 9R is connected between the lines L4, L5 by a conductor C11 which includes normally closed limit switches LS1, LS2. The switches LS–1, LS–2 are mounted on the press 10 and are opened by movement of certain parts of the press which have not been illustrated. Opening of either of the limit switches LS1, LS2 will, of course, de-energize the relay 9R, closing the contacts 9RC–1, 9RC–2 and energizing the relays 5R, 6R. The contacts 9RC–2 are time closing contacts so that when the relay 9R is de-energized, the relay 5R is immediately energized, while the relay 6R remains de-energized for a short time. Sequential energization of the relays 5R, 6R to actuate the contacts 5RC–1, 5RC–2 and 6RC–1–6RC–4, respectively, produces a stepped increase in torque applied to the press 10 by the motor 21 as the press is accelerated from trip to run speeds. Additionally, normally closed relay contacts 2RC–4 of the relay 2R are connected between the power line L4 and the relay 9R to maintain the relay 9R energized on starting to force a three step acceleration so that the motor cannot be started with a shorted rotor.

The running speed of the press may be adjusted by the operator by actuation of a conventional linkage 63 to cause the taps 29a, 29b, 29c to be moved relative to their respective transformer windings to change the impedance apparent to the secondary winding of the motor. When the sliders are moved by the linkage 63 along the legs of the transformer means 27 toward the neutral tap 28, the effective turns ratio of each autotransformer is stepped up, increasing the running speed of the press, while moving the sliders away from the neutral tap 28 decreases the effective turns ratio to decrease the running speed of the press accordingly.

The press is stopped by depressing the switch S4, dropping out the relays 1R, 2R and opening the relay contacts associated therewith. The contacts 2RC–3 are time opening contacts and are operative to maintain the relay 4R energized for a short time subsequent to depressing of the switch S4 so that the braking relay 7R may be energized to close the contacts 7RC-1 and maintain the relay 4R energized prior to opening of the contacts 2RC-3. The relay 4R maintains the relay 4RC-1 open providing the aforementioned braking effect as the motor decelerates. At 65 cycles the relay 7R is de-energized opening the relay contacts 7RC-1 to de-energize the relay 4R and close the contacts 4RC-1.

Figure 5:
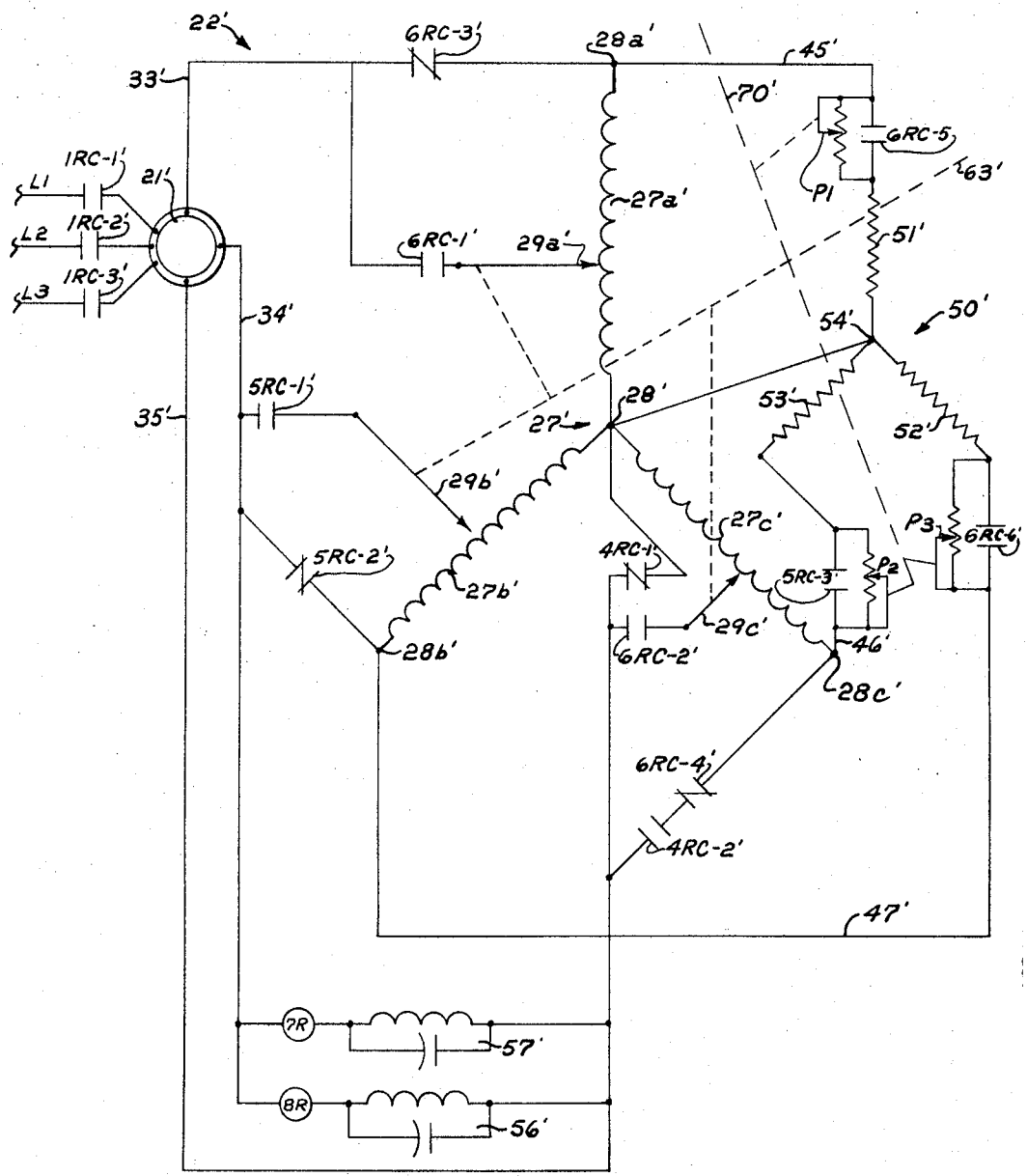
FIG. 5 is a modification of the motor drive and control circuit shown in FIG. 2.

FIG. 5 illustrates a modification of a drive for a printing press embodying the present invention. As shown in FIG. 5, a wound rotor motor 21' is associated with speed control circuit 22' including a resistor network 50' and a transformer means 27'. The motor 21', resistor network 50', and the transformer means 27' cooperate with the control circuit A in the same manner as previously described. When the press is operated at running speed, the speed thereof is variably adjusted by actuation of the linkage 63' to move the slidable taps 29a', 29b', 29c' relative to the legs of the transformer means providing the variable step-up transformer effect, previously referred to, in order to change the speed of the press as desired. When the press is tripped, its trip speed may be varied by adjusting the resistance of the resistor network 50'.

The resistor network 50' includes resistors 51', 52', 53' connected together at a common junction 54' at one of their ends and the other of their respective ends to end taps 28a', 28b', 28c' of the transformers 27a', 27b', 27c' respectively through conductors 45', 46', 47'. The conductors 45', 47' include normally open contacts 6RC-5, 6RC-6 respectively which are actuable by the relay 6R of the circuit A. The conductor 46' includes normally open contacts 5RC-3 which are actuatable by energization of the relay 5R in the circuit A. The contacts 6RC-5, 6RC-6, 5RC-3 are associated with variable resistances P1, P2, P3, respectively, which are connected in parallel with their associated contacts. It will be apparent that when the press is running, the contacts 6RC-5, 6RC-6, 5RC-3 will be closed to shunt the resistances P1, P2, P3 and provide a transformer secondary circuit between the load network 50' and the terminals of the transformer means 27', and that when the press is being driven at trip speed the contacts 6RC-5, 6RC-6, 5RC-3 will be opened, closing a transformer secondary circuit between the load network 50' and the transformer means 27' through the variable resistances P1, P2, P3. When the press is operated at trip speed the transformer assembly 27' is, for practical purposes, removed from the circuit since the conductors 33', 34', 35' are directly connected with the conductors 45', 46', 47', respectively, at the end taps of the transformers 27a', 27b', 27c'. When the transformer means 27' is thus removed from the circuit the impedance of the speed control circuit is controlled by the resistance of the load network 50' including the variable resistors P1, P2, P3. The resistors P1, P2, P3 are ganged together by a conventional linkage 70 which is manually operable by the operator of the press to vary the press trip speed as desired.

It can now be seen that a new and improved drive for printing press has been provided which permits adjustment of the running speed of the press and adjustment of the trip speed of the press independently by the operator and which is constructed so that adjustment in the running speed of the press will have no effect on a preselected trip speed thereof.

While the preferred embodiments of the present invention have been described in considerable detail, it is to be understood that the invention is not to be considered to be limited to the precise constructions shown. It is our intention to cover hereby all constructions, modifications and arrangements which fall within the ability of those skilled in the art and with the scope and spirit of the present invention.

Having described our invention, we claim:

1. An electric motor drive comprising a wound rotor motor having a secondary winding and a speed control circuit for controlling the speed of said motor comprising an electric load, transformer means for coupling said secondary winding to said load, said transformer means having a secondary circuit including said load and movable primary tap means connectible to said secondary winding and movable to adjust the transformer ratio and the running speed of said motor, a first circuit for connecting said transformer means to said secondary windings separately from said tap means to operate said drive at a first speed, a second circuit for connecting said secondary winding to said movable tap means separately from said first circuit to operate said drive at a higher second speed, switch means operable between a first condition rendering said first circuit effective and disconnecting said tap means from said secondary winding and a second condition rendering said second circuit effective to connect said tap means to said secondary winding and rendering said first circuit ineffective, and circuit means for operating said switch means between its said conditions.

2. A drive as defined in claim 1 and further including circuit elements in said secondary circuit of said transformer which are operable to change the speed of said motor when said switch means is in said first condition.

3. A drive as defined in claim 2 wherein said circuit elements include contacts for connecting a respective tap on said transformer means to said load to provide different transformation ratios for said transformer means and means for closing a selected one of said contacts.

4. A drive as defined in claim 2 wherein said circuit elements include variable resistance means operable to change said load to change the speed of said motor.

5. A printing press drive comprising a wound rotor motor having a secondary winding, speed control circuit means connected to said secondary winding for controlling the speed of said motor at running speed and trip slow speed of the press including a load, transformer means having primary and secondary circuits, said load being connected in said secondary circuit, said transformer means including tap means connectible with said motor secondary and effective on movement thereof to adjustably change the speed of said motor in a first speed range, circuit means connectible with said transformer means separately from said tap means to provide operation in a second range, and switch means having a first condition operable to render said tap means effective and said circuit means ineffective to control the speed of said motor and a second condition operable to render said circuit means effective and said tap means ineffective to control said motor speed.

6. A printing press as defined in claim 5 wherein said circuit means includes circuit elements operable to change the speed of said motor independently of said tap means when said switch means is in said second condition.

7. A printing press as defined in claim 6 wherein said transformer means includes a plurality of fixed taps and said circuit elements operate to selectively connect said transformer secondary circuit and the motor secondary to selected ones of said taps, said circuit elements being operable to connect said load to a selected one of a plurality of said fixed taps and to connect the motor secondary to a selected one of a plurality of said fixed taps.

8. A printing press drive as defined in claim 5 wherein said transformer means includes a plurality of auto-transformers having a common terminal.

9. A printing press as defined in claim 6 wherein said circuit elements include contacts operable to change the transformation ratio of said transformer means by connecting taps of said transformer means with said motor secondary and said load respectively.

10. A printing press drive as defined in claim 6 wherein said circuit elements include a variable resistance means operable to adjustably change the load on said transformer means to change the speed of said motor independently of said tap means.

11. An electric motor drive comprising a wound rotor motor having a secondary winding and a speed control circuit for controlling the speed of said motor comprising an electric load, transformer means interconnecting said secondary winding and said load, said transformer means comprising a movable means for varying the transformer ratio in a substantially stepless manner, first circuit means for connecting the transformer means to said secondary winding and to said load to provide a run speed for said motor which is adjustable by moving said movable means, said transformer means further comprising tap means for providing a plurality of predetermined voltage ratios independently of the position of said movable means, second circuit means for selectively connecting said tap means in circuit with said secondary winding and said load to provide a selected voltage ratio and a predetermined speed, and switch means for rendering said first circuit means ineffective and said second circuit means effective and vice versa.

12. An electric motor drive as defined in claim 11 and wherein said second circuit means includes circuit elements operable to change the speed of said motor when said switch means renders said first circuit means ineffective.

13. An electric motor drive comprising a wound rotor motor having a secondary winding and a speed control circuit for controlling the speed of said motor comprising an electric load, transformer means for coupling said secondary winding to said load, said transformer means having a secondary circuit including said load and movable primary tap means connectible to said secondary winding and movable to adjust the transformer ratio and the running speed of said motor, a first circuit for connecting said transformer means to said secondary winding separately from said tap means to operate said drive at a first speed, a second circuit for connecting said secondary winding to said movable tap means separately from said first circuit to operate said drive at a higher second speed, switch means operable between a first condition rendering said first circuit effective and disconnecting said tap means from said secondary winding and a second condition rendering said second circuit effective to connect said tap means to said secondary winding and rendering said first circuit ineffective, and circuit means for operating said switch means between its said conditions, said drive further including starting torque means effective on starting of said motor when said switch means is in said first condition to change the connection between said motor secondary winding and said transformer means to increase the starting torque of said motor and means operable as said motor comes up to said first speed to render said starting torque means ineffective.

14. An electric motor drive comprising a wound rotor motor having a secondary winding and a speed control circuit for controlling the speed of said motor comprising an electric load, transformer means for coupling said secondary winding to said load, said transformer means having a secondary circuit including said load and movable primary tap means connectible to said secondary winding and movable to adjust the transformer ratio and the running speed of said motor, a first circuit for connecting said transformer means to said secondary windings separately from said tap means to operate said drive at a first speed, a second circuit for connecting said secondary winding to said movable tap means separately from said first circuit to operate said drive at a higher second speed, switch means operable between a first condition rendering said first circuit effective and disconnecting said tap means from said secondary winding and a second condition rendering said second circuit effective to connect said tap means to said secondary winding and rendering said first circuit ineffective, and circuit means for operating said switch means between its said conditions, said switch means being in its said first condition on starting and stopping and the drive further including starting torque means effective when said switch means is in its said first condition to change the connections of said first circuit to connect said motor secondary winding to said transformer means to provide increased torque over that provided by said first circuit, said drive including means operable after starting as said motor comes up to said first speed to render said starting torque means ineffective, control means energizable and de-energizable to effect starting and stopping of said motor, said control means including an element to be actuated to a condition rendering said starting torque means effective upon the operation of said control means to stop said motor, and means operable upon the operation of said control means to stop said motor for maintaining said element in a non-actuated condition rendering said torque means ineffective until after said motor is substantially stopped.

15. A printing press drive comprising a wound rotor motor having a secondary winding, speed control circuit means connected to said secondary winding for controlling the speed of said motor at running speed and trip slow speed of the press including a load, transformer means having primary and secondary circuits, said load being connected in said secondary circuit, said transformer means including tap means connectible with said motor secondary winding and effective on movement thereof to adjustably change the speed of said motor in a first speed range, circuit means connectible with said transformer means separately from said tap means to provide operation in a second range, switch means having a first condition operable to render said tap means effective and said circuit means ineffective to control the speed of said motor and a second condition operable to render said circuit means effective and said tap means ineffective to control said motor speed, said circuit means including circuit elements operable to change the speed of said motor independently of the position of said tap means when said switch means is in said second condition, said transformer means including a plurality of fixed taps and said circuit elements being operable to connect said load to a selected one of a plurality of said fixed taps and to connect the motor secondary winding to a selected one of a plurality of said fixed taps, said circuit elements including a multi-position switch having a first position at which a first pair of contacts is closed to effect a step up transformation ratio of the transformer means and a second position at which said first pair of contacts is open and a second pair of contacts is closed to effect a step down transformation ratio of said transformer means, the speed of said motor decreasing when said multi-position switch is moved between said first and said second positions.

16. A printing press drive comprising a wound rotor motor having a secondary winding, speed control circuit means connected to said secondary winding for controlling the speed of said motor at running speed and trip slow speed of the press including a load, transformer means having primary and secondary circuits, said load being connected in said secondary circuit, said transformer means including tap means connectible with said motor secondary winding and effective on movement thereof to adjustably change the speed of said motor in a first speed range, circuit means connectible with said transformer means separately from said tap means to provide operation in a second range, switch means having a first condition operable to render said tap means effective and said circuit means ineffective to control the speed of said motor and a second condition operable to render said circuit means effective and said tap means ineffective to control said motor speed, said circuit means including circuit elements operable to change the speed of said motor independently of said tap means when said switch means is in said second condition, said circuit elements including a variable resistance means operable to adjustably change the load on said transformer means to change the speed of said motor independently of the position of said tap means, said variable resistance means being connected in series with said load when said switch means is in said second condition and substantially ineffective to change said load when said switch means is in said first condition.

17. A printing press drive as defined in claim 16 wherein contacts are connected in parallel with said variable resistance means, said contacts closed when said switch means is in said second condition to shunt said resistance means and open when said switch means is in said first condition.

References Cited

UNITED STATES PATENTS

| | | | |
|---|---|---|---|
| 660,911 | 10/1900 | Lamme | 318—238 |
| 1,374,559 | 4/1921 | Fortescue | 318—237 |
| 3,217,222 | 11/1965 | Lee | 318—240 |
| 3,231,805 | 2/1966 | Shibata | 318—238 |

ORIS L. RADER, *Primary Examiner.*

GENE RUBINSON, *Assistant Examiner.*